US012382932B2

(12) United States Patent
Biffert et al.

(10) Patent No.: US 12,382,932 B2
(45) Date of Patent: Aug. 12, 2025

(54) LIVESTOCK MONITORING SYSTEM AND METHODS OF USE

(71) Applicant: 701x Inc., Fargo, ND (US)

(72) Inventors: Kevin N. Biffert, Horace, ND (US); Maximillion K. Cossette, Fargo, ND (US); Steven J. Berlinger, Dilworth, MN (US); Peter S. Crowley, Fargo, ND (US); Cole L Mehring, Fargo, ND (US); Keith D. Alsleben, Fargo, ND (US); Braydon W. Love, Fergus Falls, MN (US); Chad A. Heath, Fargo, ND (US)

(73) Assignee: 701x Inc., Fargo, ND (US)

( * ) Notice: Subject to any disclaimer, the term of this patent is extended or adjusted under 35 U.S.C. 154(b) by 57 days.

(21) Appl. No.: 18/330,659

(22) Filed: Jun. 7, 2023

(65) Prior Publication Data

US 2024/0407338 A1    Dec. 12, 2024

(51) Int. Cl.
*A01K 29/00* (2006.01)
*G06Q 50/02* (2024.01)

(52) U.S. Cl.
CPC ........... *A01K 29/005* (2013.01); *G06Q 50/02* (2013.01)

(58) Field of Classification Search
CPC .............................. A01K 29/005; G06Q 50/02
See application file for complete search history.

(56) References Cited

U.S. PATENT DOCUMENTS

| | | |
|---|---|---|
| 4,461,241 A | 7/1984 | Ostler |
| 4,503,808 A | 3/1985 | McAlister |
| 4,512,096 A | 4/1985 | Heidecker |
| 5,711,246 A | 1/1998 | Yano |
| 5,791,294 A | 8/1998 | Manning |
| 5,794,569 A | 8/1998 | Titus |
| 5,857,433 A | 1/1999 | Files |
| 6,067,018 A | 5/2000 | Skelton |
| 6,111,508 A | 8/2000 | Ensor |
| 6,243,039 B1 | 6/2001 | Elliot |
| 6,375,612 B1 | 4/2002 | Guichon |
| 6,507,771 B2 | 1/2003 | Payton |

(Continued)

FOREIGN PATENT DOCUMENTS

| | | |
|---|---|---|
| AU | 2017239570 A1 | 4/2018 |
| CN | 101221231 A | 7/2008 |

(Continued)

OTHER PUBLICATIONS

Atmel 8-Bit AVR Microcontroller with 2/4/8K Byes In-System Programmable Flash Datasheet; 2013. (Year: 2013).

(Continued)

*Primary Examiner* — Quan Zhen Wang
*Assistant Examiner* — Mancil Littlejohn, Jr.
(74) *Attorney, Agent, or Firm* — Neustel Law Offices

(57) ABSTRACT

Livestock movement monitoring system and method of use are disclosed herein. An example method includes receiving output from each of a plurality of sensors that are associated with livestock in a confined area, tracking a position and movement of the livestock from the output, determining at least one deviation from an expected parameter using the position and movement, and transmitting an alert to a recipient when the at least one deviation has been determined.

16 Claims, 5 Drawing Sheets

(56) References Cited

U.S. PATENT DOCUMENTS

| | | |
|---|---|---|
| 6,510,380 B1 | 1/2003 | Curatolo |
| 6,512,478 B1 | 1/2003 | Chien |
| 6,674,368 B2 | 1/2004 | Hawkins |
| 6,720,879 B2 | 4/2004 | Edwards |
| 6,788,199 B2 | 9/2004 | Crabtree |
| 6,805,078 B2 | 10/2004 | Zimmerman |
| 6,868,804 B1 | 3/2005 | Huisma |
| 6,997,140 B2 | 2/2006 | Finlayson |
| 6,998,980 B2 | 2/2006 | Ingley, III |
| 6,998,985 B2 | 2/2006 | Reisman |
| 7,059,275 B2 | 6/2006 | Laitinen |
| 7,164,986 B2 | 1/2007 | Humphries |
| 7,218,229 B2 | 5/2007 | Boyd |
| 7,234,421 B2 | 6/2007 | Natividade et al. |
| 7,248,167 B2 | 7/2007 | Wassingbo |
| 7,335,168 B2 | 2/2008 | Rugg |
| 7,411,492 B2 | 8/2008 | Greenberg |
| 7,467,603 B2 | 12/2008 | Davies |
| 7,525,425 B2 | 4/2009 | Diem |
| 7,616,124 B2 | 11/2009 | Paessel |
| 7,728,724 B1 | 6/2010 | Scalisi |
| 7,830,257 B2 | 11/2010 | Hassell |
| 7,904,244 B2 | 3/2011 | Sugla |
| 7,918,185 B2 | 4/2011 | Araki |
| 8,018,329 B2 | 9/2011 | Morgan |
| 8,125,332 B2 | 2/2012 | Curran |
| 8,149,125 B2 | 4/2012 | Geissler |
| 8,285,245 B2 | 10/2012 | Ashley, Jr. |
| 8,312,845 B2 | 11/2012 | Guinta |
| 8,340,022 B2 | 12/2012 | Lee |
| 8,642,262 B2 * | 2/2014 | Stroman ............ G06Q 30/0203 |
| | | 435/7.1 |
| 8,849,926 B2 | 9/2014 | Marzencki |
| 8,890,677 B2 | 11/2014 | Raphaeli |
| 8,979,757 B2 | 3/2015 | Mottram |
| 8,983,426 B2 | 3/2015 | Cermak |
| 9,038,293 B2 | 5/2015 | Decaluwe |
| 9,044,297 B2 | 6/2015 | Rajkondawar |
| 9,370,170 B2 | 6/2016 | Downing |
| 9,448,072 B2 | 9/2016 | Bandyopadhyay |
| 9,449,202 B2 | 9/2016 | Clare |
| 9,489,813 B1 | 11/2016 | Beigel |
| 9,504,387 B2 | 11/2016 | Lanza |
| 9,848,577 B1 | 12/2017 | Brandao |
| 9,936,676 B1 | 4/2018 | Ulmer |
| 9,980,467 B2 | 5/2018 | Auer |
| 10,075,813 B1 | 9/2018 | Struhsaker |
| 10,242,547 B1 | 3/2019 | Struhsaker |
| 10,292,370 B2 | 5/2019 | Mobley |
| 10,660,546 B2 | 5/2020 | Saigh |
| 10,697,947 B1 | 6/2020 | Armitage |
| 11,232,393 B1 | 1/2022 | Kim |
| 11,503,802 B2 | 11/2022 | Jones |
| 12,029,197 B1 | 7/2024 | Biffert |
| 2002/0046713 A1 | 4/2002 | Otto |
| 2002/0050248 A1 * | 5/2002 | Pratt ...................... A01K 29/00 |
| | | 119/51.02 |
| 2004/0074448 A1 | 4/2004 | Bunt |
| 2004/0078390 A1 | 4/2004 | Saunders |
| 2005/0006153 A1 | 1/2005 | Baarsch |
| 2005/0162279 A1 | 7/2005 | Marshall |
| 2006/0097882 A1 | 5/2006 | Brinkerhoff |
| 2006/0161443 A1 | 7/2006 | Rollins |
| 2006/0201432 A1 | 9/2006 | Pratt |
| 2006/0267731 A1 | 11/2006 | Chen |
| 2007/0012260 A1 | 1/2007 | Boyd |
| 2007/0171048 A1 | 7/2007 | Shapiro |
| 2007/0209594 A1 | 9/2007 | Kaever |
| 2007/0229350 A1 | 10/2007 | Scalisi |
| 2008/0147458 A1 | 6/2008 | Yamazaki |
| 2010/0030036 A1 | 2/2010 | Mottram |
| 2010/0127853 A1 | 5/2010 | Hanson |
| 2010/0156606 A1 | 6/2010 | Gold |
| 2011/0102154 A1 | 5/2011 | Hindhede |
| 2011/0125062 A1 | 5/2011 | Mulder |
| 2011/0125065 A1 | 5/2011 | Voronin |
| 2011/0148639 A1 | 6/2011 | Geissler |
| 2011/0192356 A1 | 8/2011 | Loosveld |
| 2012/0050046 A1 | 3/2012 | Satorius |
| 2012/0065483 A1 | 3/2012 | Chung |
| 2012/0294876 A1 | 11/2012 | Zimmerman |
| 2013/0175347 A1 | 7/2013 | Decaluwe |
| 2013/0340305 A1 | 12/2013 | Mobley |
| 2014/0237595 A1 | 8/2014 | Sridhara |
| 2015/0039239 A1 | 2/2015 | Shuler |
| 2015/0097668 A1 | 4/2015 | Toth |
| 2015/0282457 A1 | 10/2015 | Yarden |
| 2015/0373951 A1 | 12/2015 | Kelly |
| 2016/0143719 A1 | 5/2016 | Folkers |
| 2017/0156288 A1 | 6/2017 | Singh |
| 2017/0196203 A1 | 7/2017 | Huisma |
| 2018/0048987 A1 | 2/2018 | Morris |
| 2018/0054399 A1 | 2/2018 | Shinoda |
| 2018/0146645 A1 | 5/2018 | Arbel |
| 2018/0160649 A1 * | 6/2018 | Hicks ...................... A01K 7/02 |
| 2018/0279582 A1 | 10/2018 | Yajima |
| 2018/0295809 A1 | 10/2018 | Yajima |
| 2018/0374165 A1 | 12/2018 | Ferro dos Santos |
| 2019/0008117 A1 | 1/2019 | Dijkstra |
| 2019/0008124 A1 | 1/2019 | Komatsu |
| 2019/0141959 A1 | 5/2019 | Ingham |
| 2019/0220844 A1 | 7/2019 | Trivelpiece |
| 2019/0223408 A1 | 7/2019 | Brayer |
| 2019/0254601 A1 | 8/2019 | Blackmore |
| 2019/0380311 A1 * | 12/2019 | Crouthamel ......... A01K 11/004 |
| 2020/0022338 A1 | 1/2020 | Rovnyi |
| 2020/0029534 A1 | 1/2020 | Austin |
| 2020/0085005 A1 | 3/2020 | Yoo |
| 2020/0107522 A1 | 4/2020 | Kersey |
| 2020/0125849 A1 | 4/2020 | Labrecque |
| 2020/0159720 A1 | 5/2020 | Leong |
| 2020/0160009 A1 | 5/2020 | Vatn |
| 2020/0323170 A1 | 10/2020 | Garigan |
| 2020/0359605 A1 | 11/2020 | Maher |
| 2020/0367471 A1 | 11/2020 | Deliou |
| 2021/0148881 A1 | 5/2021 | Deng |
| 2022/0104929 A1 | 4/2022 | Cummins |
| 2022/0192150 A1 | 6/2022 | Biffert |
| 2022/0192151 A1 | 6/2022 | Biffert |
| 2022/0192152 A1 | 6/2022 | Biffert |
| 2022/0200519 A1 | 6/2022 | Biffert |

FOREIGN PATENT DOCUMENTS

| | | |
|---|---|---|
| EP | 3153095 A1 | 4/2017 |
| EP | 3188648 B1 | 1/2020 |
| FR | 2801491 A1 | 6/2001 |
| GB | 2387465 A | 10/2003 |
| WO | 2000011939 A2 | 3/2000 |
| WO | 2005034617 A1 | 4/2005 |
| WO | 2019245978 A1 | 12/2019 |
| WO | 2020031050 A1 | 2/2020 |
| WO | 2020120516 A1 | 6/2020 |
| WO | 2021255731 A1 | 12/2021 |
| WO | WO-2022005288 A1 * | 1/2022 ........... A01K 11/006 |
| WO | 2022145792 A1 | 7/2022 |
| WO | 2023159272 A1 | 8/2023 |

OTHER PUBLICATIONS

Non-Final Office Action Document Received for U.S. Appl. No. 17/557,559.

http://www.precisionanimalsolutions.com/how-it-works-.html; Precision Animal Solutions REDI Website; Mar. 14, 2023.

http://www.sensehubbeef.com/; Allflex Livestock Intelligence "SenseHub Beef" Webpage.

http://www.sensehubbeef.com/documents/pdf/SenseHubBeef.pdf; Allflex Livestock Intelligence "SenseHub Beef" Cow Monitoring Brochure; Copyright 2018.

https://www.cerestag.com/; Ceres Tag Website.

https://web.archive.org/web/20200806065228/https://www.cerestag.com/benefits/; Internet Archive Wayback Machine Archive.org "Ceres Tag Benefits" Webpage; Aug. 6, 2020.

(56) References Cited

OTHER PUBLICATIONS https://www.moovement.com.au/gps-ear-tags; mOOvement "GPS Ear Tag" Website.
https://ieeexplore.ieee.org/document/1280774; IEEE Xplore Webpage Article "Wearable Sensor System for Wireless State-of-Health Determination in Cattle"; L. Nagl; Sep. 17, 2003.
https://www.mdpi.com/1424-8220/9/5/3586/htm; MDPI Webpage Article "Monitoring Animal Behaviour and Environmental Interactions Using Wireless Sensor Networks, GPS Collars and Satellite Remote Sensing"; Rebecca N. Handcock; Published May 13, 2009.
https://www.mdpi.com/1424-8220/9/5/3942/pdf; MDPI.com Webpage Article "A Heterogeneous Wireless Identification Network for the Localization of Animals based on Stochastic Movements"; Alvaro Gutierrez; May 25, 2009.
http://www.diva-portal.org/smash/get/diva2:21508/FULLTEXT01.pdf; Diva Article "Sensor Systems for Positioning and Identification in Ubiquitous Computing"; Suri Jayabharath Kumar; Feb. 13, 2006.
https:/www.beefcentral.com/ag-tech/gps-enabled-livestock-monitoring-tags-reach-the-commercial-market/; GPS-enabled livestock monitoring tags reach the commercial market; Beef Central; Mar. 17, 2020.
https://journalajarr.com/index.php/AJARR/article/view/13035/23855; "Design and Implementation of a Cattle Grazing Tracking and Anti-theft Alert GPS/GSM Collar, Leveraging on Improvement in Telecom and ICT Infrastructure", Asian Journal of Advanced Research and Reports, May 25, 2018.
PCT International Search Report and Opinion for PCT/US2021/064611; Apr. 27, 2022.
https://www.gammon.com.au/power; "Power Saving Techniques for Microprocessors" Gammon Forum Webpage; Jan. 13, 2012.
PCT International Search Report and Written Opinion for PCT/US2023/086378; Apr. 11, 2024.
PCT International Search Report and Written Opinion for PCT/US2023/086390; Apr. 19, 2024.
Notice of Allowance Document Received for U.S. Appl. No. 18/162,885.
EPO Search Report and Opinion for Publication No. EP4266876; Oct. 8, 2024.
PCT Search Report and Opinion for PCT/US2024/029580; Sep. 17, 2024.
Non-Final Office Action Document Received for U.S. Appl. No. 18/302,351.
Non-Final Office Action Document Received for U.S. Appl. No. 18/303,730.

\* cited by examiner

LIVESTOCK MONITORING SYSTEM AND METHODS OF USE

CROSS-REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to a livestock monitoring system, and more particularly, but not by way of limitation, to systems and methods of monitoring livestock using real-time location and sensor measurements to infer aspects of livestock health.

SUMMARY

In one example embodiment, the present disclosure is directed to a method that includes receiving output from each of a plurality of sensors that are associated with livestock in a confined area. In some embodiments, each animal has at least one sensor. The method can include tracking a position and movement of the livestock from the output of the sensors. The method includes a step of determining at least one deviation from an expected parameter using the position and movement. For example, a head height or angle can be compared to an example threshold or tracked over time to determine if the animal's head is hanging downward, which is a sign of sickness or overall unwellness. Many different kinds of parameters can be tracked and compared in this way and these examples are not intended to be limiting. Next, once a deviation in a parameter is detected, the method can include transmitting an alert to a recipient to inform them of the deviation.

In another example embodiment, a system can include a processor and a memory for storing instructions. The processor executes the instructions to receive output from each of a plurality of sensors that are associated with livestock in a confined area. The system can track a position and movement of the livestock from the output and determine at least one deviation from an expected parameter using the position and movement. Also, the system can transmit an alert to a recipient when the at least one deviation has been determined.

In some embodiments, the system can include a weight scale in combination with an animal attractant such as food, water, or other stimuli. In some instances, the system can include an optical scanner that can be used to assess any of yearling height, scrotal circumference, mature height, claw set, foot angle, body condition score, marbling, ribeye area, fat thickness and/or hair shed. Again, these are merely examples and are not intended to be limiting.

There have thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in their application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

Figure 1:
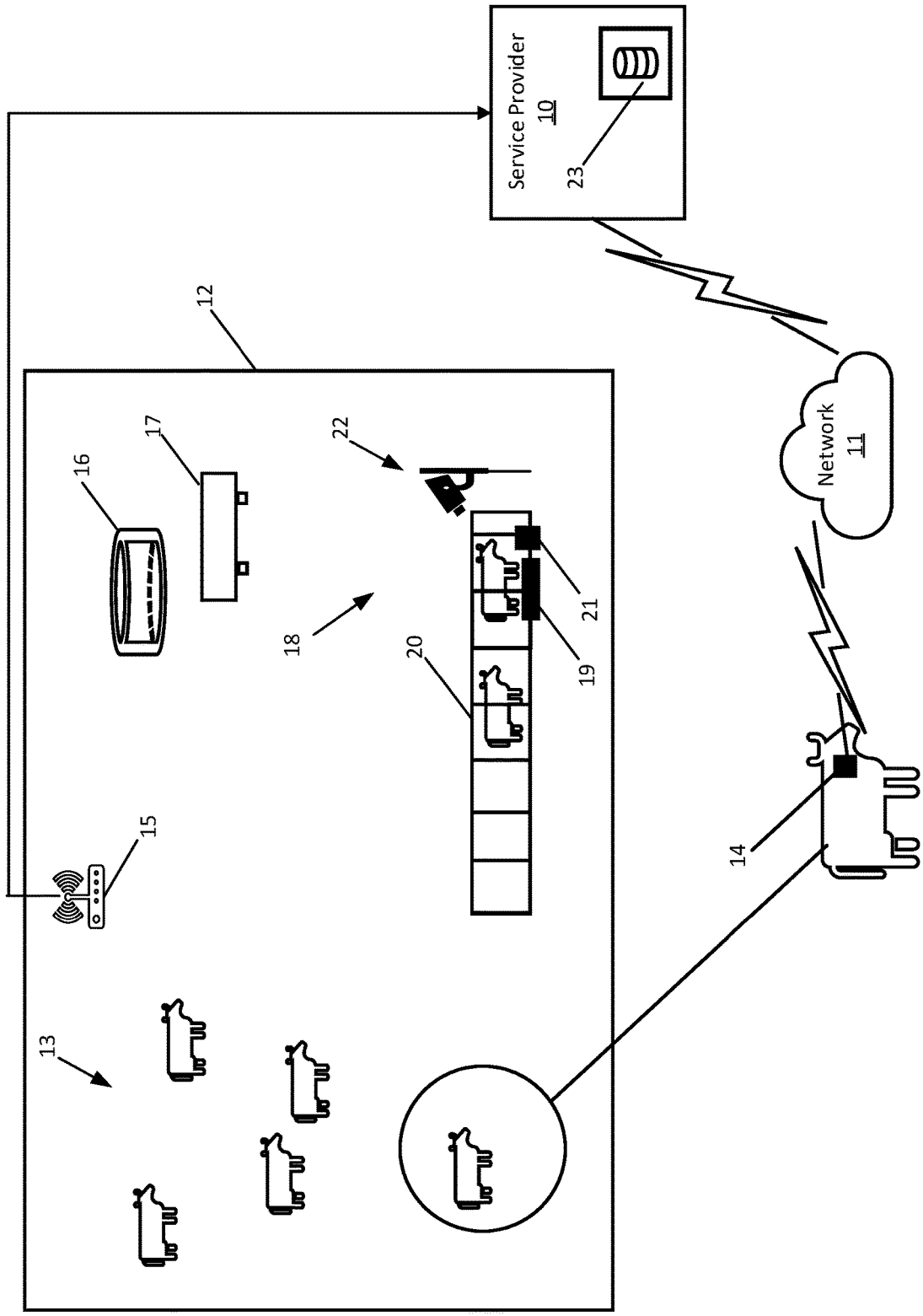
FIG. 1 is a perspective view of an example system in accordance with an example embodiment.

The present disclosure pertains to systems and methods for livestock management. In some embodiments, livestock are placed in a confinement area. This area could include a parcel of land with defined boundaries, but any other confinement area known to one of skill in the art can be used. Each of the livestock can be outfitted with one or more sensors that are configured to track a location and movement of the livestock over time. A service provider system can receive the output of these sensors in real-time or near-real-time using triangulation, and dead reckoning—just to name a few. These output data can be relayed directly by the sensors or indirectly through a network.

In general, the output of the sensors can be used to determine at least one type of deviation in one or more parameters and transmit an alert when a deviation is determined. Some parameters can include aspects such as head height, head angle, time at a watering or feed trough, and the like, although these parameters are merely examples. In general, a deviation in a parameter can be determined by finding changes in the parameter over time, or when the parameter is compared to a threshold value. For example, a deviation may be determined when an animal begins to move less. Thus, the movement parameter is evaluated over time and changes in this parameter may indicate health issues. Another example of a biometric parameter is yearling height. With this parameter, a height measurement can be obtained from camera output and this can be compared to an expected or threshold value. A deviation between actual height and measured height may indicate illness or stunted growth.

In more detail, the system can automate a process of obtaining a height measurement through camera pictures/optical scanner (or potentially a sensor) so that the expected progeny difference (EPD) can be calculated. However, changes in hip height measurements and frame score could be an indicator of illness or stunted growth.

Yearling height is defined as a predictor of a sire's ability to transmit yearling height (to its progeny), expressed in inches, compared to that of other sires. Height measurements are taken at the hip, and height (the actual measurement and not the EPD), along with age, is used to calculate a frame score.

Other examples of EPDs include marbling, ribeye area, and fat thickness which could be predicted through the use of an optical scanner or examination upon harvesting. Weights can be determined, in some embodiments, via an optical scanner with a machine learning algorithm. Birth weight, weaning weight, and yearling weight are also examples, and are taken at different time periods in the animal's life, i.e., one day old, 205 days old, and 365 days old. If an animal isn't weighed at exactly 205 days there is an adjustment metric applied to obtain an adjusted weaning weight score. Docility can be measured by social interactions noticed on this system, and this relates to animal movements. Pulmonary arterial pressure measured through movement and camera output.

Pictures taken from a known location can be used to track height via image recognition using a fixed position camera. If the camera position doesn't change and the animal is always in relatively the same position(s) when they have their picture taken then having a single known height of any object also in the picture should make tracking growth consistent.

In general, the system is configured to determine deviations in an animal's behavior or biometric data and send health alerts before visual illness signs appear. As noted, this can include monitoring the movement of the animals as well as noticing if an average head height starts to decline. The amount of time eating, drinking, standing, lying, walking, running, ruminating, and mounting can all be determined by sensors producing a Bluetooth beacon signal and antenna triangulation. Deviations in these behaviors can be key health indicators, relating to specific diseases and illnesses. Those behaviors can also be used to determine calving and estrus. Tracking head height and angle may also identify mounting instances.

To be sure, hanging of the head is a common visual illness sign. The system can also record an amount of time the animal's head is in a feed trough or a water source (trough, tank, pond, etc.), which helps identify feed efficiencies of animals (how much they take in and how much they gain). Deviations in the amount of time these animals spend at water and feed sources are also illness indicators.

An example system can include a scale option. The configuration of the weight scale is such that animals may walk through single-file with weight being automatically recorded and associated with a uniquely identified tag (e.g., an example sensor type).

The service provider generates an unchangeable date and time stamp for these data. In one embodiment, weight measurements are obtained more frequently and autonomously by having water on one side of the scale area and feed on the other side (or some other animal attractant i.e., mineral). These data are used to automatically gather and calculate the livestock's average daily gain and dry matter intake as well as calculate its average daily gain and dry matter intake expected progeny differences (EPDs).

The system can also include an optical measurement system, such as a camera, to automatically capture biometric data such as yearling height, scrotal circumference, mature height, claw set, foot angle, body condition score, and hair shed EPDs. To be sure, this list is not exhaustive.

U.S. Patent Publication No. US-2022-0192152-A1, the entire disclosure of which, except for any definitions, disclaimers, disavowals, and inconsistencies, is incorporated herein by reference.

B. Exemplary Telecommunications Networks

Some of the embodiments of the present disclosure may be utilized upon any telecommunications network capable of transmitting data including voice data and other types of electronic data. Examples of suitable telecommunications networks for some of the embodiments of the present disclosure include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). Some of the example embodiments of the present disclosure may communicate via a single telecommunications network or multiple telecommunications networks concurrently. Various protocols may be utilized by the electronic devices for communications such as but not limited to HTTP, SMTP, FTP and WAP (wireless Application Protocol). Some of the embodiments of the present disclosure may be implemented upon various wireless networks such as but not limited to 3G, 4G, 5G, LTE, CDPD, CDMA, GSM, PDC, PHS, TDMA, FLEX, REFLEX, IDEN, TETRA, DECT, DATATAC, and MOBITEX. Some of the various example embodiments of the present disclosure may also be utilized with online services and internet service providers.

The Internet is an exemplary telecommunications network for the embodiments of the present disclosure. The Internet is comprised of a global computer network having a plurality of computer systems around the world that are in communication with one another. Via the Internet, the computer systems are able to transmit various types of data between one another. The communications between the computer systems may be accomplished via 11 various methods such as but not limited to wireless, Ethernet, cable, direct connection, telephone lines, and satellite.

C. Central Communication Unit

The central communication unit may be comprised of any central communication site where communications are preferably established with. The central communication units may be comprised of a server computer, cloud-based computer, virtual computer, home computer or other computer system capable of receiving and transmitting data via IP networks and the telecommunication networks. As can be appreciated, a modem or other communication device may be required between each of the central communication units and the corresponding telecommunication networks. The central communication unit may be comprised of any electronic system capable of receiving and transmitting information (e.g. voice data, computer data, etc.)

D. Mobile Device

The mobile device may be comprised of any type of computer for practicing the various aspects of the embodiments of the present disclosure. For example, the mobile device can be a personal computer (e.g., APPLE® based computer, an IBM based computer, or compatible thereof) or tablet computer (e.g., IPAD®). The mobile device may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The mobile device may be comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the embodiments of the present disclosure. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operates to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

E. Example Embodiments

Referring now to FIG. 1, and more particularly, to a system inside an environment for tracking livestock. The system includes a service provider 10, a network 11, a confinement area 12, livestock 13, and sensors 14. It will be understood that each animal in the confinement area 12 can be associated with one or more sensors that can be tracked or monitored by the service provider 10 to monitor the health and well-being of the livestock 13. As noted above, the confinement area 12 can include any defined area that is at least partially, if not totally enclosed.

In general, any sensor 14 that outputs data can also output a unique identifier for an animal. Some sensors are passive, meaning that they output data when scanned by a reader. Alternatively, a sensor may actively transmit an animal's unique identifier each time it outputs data. In some embodiments, each time a sensor associated with an animal outputs data, the sensor 14 may transmit the animal's unique identifier therewith so that the service provider 10 may link sensor data with a particular animal. In some instances, the sensor 14 emits a (Bluetooth) beacon, or a periodic transmission of information, with a unique identifier, activity information, and an alert field to indicate if there is a reason to take a further look at the animal. The sensor also has an RFID (radio frequency identifier) coil embedded that can be actively scanned in order to output the unique identifier that was programmed into the sensor and is used to identify animals.

The sensors can be incorporated into a triangulation antenna system (see FIG. 5) that would check sensors in through a Bluetooth beacon signal that is emitted by the sensor/tag every one to five seconds (other periods of time can be used), and in some embodiments every 20 milliseconds, or even more frequently. With these beacon signals and a distance parameter (distance between sensor and antenna) it is possible to detect when the animal is doing normal activities mentioned above (eating, ruminating, etc.)

In some instances, the sensors 14 placed on the livestock 13 can include sensors that can output signals that are indicative of head angle and head height. These sensors can include accelerometers or other orientation-sensing elements. Another example sensor can be used to track a location/position of an animal. Other sensors can be used to monitor biometric data such as heart rate, blood pressure, temperature, and the like. In some instances, individual, single-purpose sensors can be used. In other embodiments, sensors can be integrated into a multi-sensor platform.

Deviations in time spent eating, drinking, ruminating, standing, lying down, walking, running, and mounting can be calculated as set forth above and used to infer animal health. In another example an animal that is calving may stand up and lay down frequently. Social interactions can be a sign of sickness; i.e., getting away from group of livestock, last animal or slower animals to get to feed bunk after being filled than most, or being slow to a freshly refilled water source or mineral can be inferred as a sign of sickness. A mucous filled nose or runny nose can be another sign of sickness that may be visible on camera images.

Regardless of the form factor, the sensors 14 can be configured to communicate over the network 11 to transmit output data to the service provider 10. The sensors 14 can incorporate hardware that enables long-range or short-range protocols to transmit data. In some instances, the sensors 14 can communicate with one another to form a mesh network and relay data to the service provider 10. In other instances, the sensors 14 are capable of transmitting data to a base station 15.

The base station 15 can then transmit the sensor data to the service provider 10. In yet other embodiments, the sensors 14 can transmit data directly to the service provider 10. Example devices that can be used in the network include various types of cellular transceivers, wireless tags, wireless beacons, sensors (both passive and active), and Wi-Fi elements, but any suitable network elements can be used. Short range communications can be used such as, Bluetooth, proprietary short range communication protocol, WLAN, TCP/IP-based LAN or an HTTP-based WAN such as the Internet Regardless of the network infrastructure used, the sensors output data that is received by the service provider 10. The service provider 10 can track a location/position and motion of each animal over a period of time. The service provider 10 can receive tracking data in real-time or near-real-time. The data from the sensors can be received synchronously and asynchronously. In some instances, location or position can be determined from, for example, GPS signals or other similar signals. When GPS signals are intermittent or unavailable, the location of an animal may be tracked using dead reckoning or triangulation, such as with cellular signals when the sensor includes cellular elements.

As mentioned infra, the service provider 10 can remotely track various parameters from sensor data and determine if there are deviations that would indicate that an animal is sick or generally unwell. In some instances, animal location can be tracked to determine if an animal has strayed or is in a dangerous location.

Broadly, sensor data can be evaluated to determine if a tracked parameter is deviant or indicates an issue with an animal. As mentioned before, a deviation can pertain to comparing a tracked parameter, such as location or weight, over a period of time and determining if that parameter has changed in such a way that it indicates that the animal is unhealthy. Another way a deviation is determined is comparing a tracked parameter to an expected or threshold value. For example, an animal's weight and age can be compared to an expected weight/age threshold to determine if the animal is gaining weight properly for its age. Thus, in sum the deviation can be based on changes in a parameter over time, a difference in a parameter when compared with a threshold, or combinations thereof.

In one example, the movement of the animals can be monitored as well as determining when an average head height starts to decline. In this example, the sensors 14 can be configured to track a location and head height via an accelerometer, or from the signals sent with RTLS/AoA. If the service provider 10 determines that the head height is lower over a period of time, as noted above, hanging of the head is a common sign of illness.

In another example, the system can also record an amount of time the animal's head is in a feed trough or a water source, which helps identify feed efficiencies of the animals (how much they take in and how much they gain). Deviations in the amount of time these animals spend at water and at feed are also illness indicators. This determination implicitly includes the service provider 10 comparing the location of the animal to a known location of a feed trough 16 or water source 17 to determine how long the animal spent at these locations.

In instances where the sensor 14 is located on an car or the animal, and the sensor 14 omits signals frequently. These signals can be used to distinguish the action of the animal by changes in the angle/height measurements (e.g., is the movement indicative of eating, ruminating, or drinking). These data can be combined with accelerometer data from the sensor (for the tags that have it equipped, some may not) where it can determine, based on head/tag movements if the animal is eating (not just standing still but actually chewing).

This information is used in combination with a head angle or head height, obtained from a sensor, to determine if the animal is feeding or drinking. In general, the service provider 10 may determine a water or feeding frequency for an animal and track changes in the frequency over time to make determinations about the health and wellness of the animal. In some embodiments, the service provider 10 may use these data to estimate an average daily weight gain and a dry matter intake to estimate expected progeny differences.

In one embodiment, the service provider 10 can establish an angle threshold and/or a height measurement threshold from sensor data. The service provider 10 can compare the angle measurement to the angle threshold and/or the height measurement to the height measurement threshold to determine if there is a deviation in any of these parameters. Again, either angle measurement and/or head height can be used to determine head hang and therefore overall wellness of the animal. That is, the service provider 10 may infer that the livestock is ill or unhealthy when either the angle measurement is lower than the angle threshold or the height measurement is lower than the height measurement threshold of the livestock, especially when these behaviors occur over a period of time. That is, individual measurements and deviations are less likely to be predicative than long-term measurements that are indicative of behavior(s). As noted above, these deviations may be due to feeding or drinking if sensed for a short period of time and the animal is located near a location where water or food is present.

The overall system may include a scale assembly 18, in some embodiments. The scale assembly 18 may include a weight scale 19 positioned inside a chute 20. The chute 20 is sized with railing or other structural members to allow for single-file passage of the livestock. The animals will be guided through the chute 20 and onto the weight scale 19 one at a time. In some instances, the animal will be kept on the scale for a period of time so that an accurate weight measurement can be obtained. To keep the animal in a stationary position on the weight scale 19, water, food, or an animal attractant 21, such as salt or minerals, may be placed in proximity to the weight scale 19, but just outside the chute 20.

The scale assembly 18 may include scanner 22, such as a radio-frequency (RF) scanner, that is configured to obtain a unique identifier worn or implanted into each animal. That is, each animal bears a passive or active means for storing a unique identifier that identifies the animal. An example means includes a passive or active RFID element, a scannable barcode or QR code, or any other means that would be known to one of ordinary skill in the art.

Some embodiments include implantable RFID chips and rumen boluses. The implantable RFID chips typically go in the ear of the animal, as meat processors may not allow for alternative placement on the animal so as to keep the sensor out of the food supply. The rumen boluses are stored in the stomach with a magnet that never allows them to get digested.

Once a weight has been obtained and a unique identifier has been scanned, these elements may be transmitted to the service provider 10, who can store the data in a record or database 23. The weight can be tracked over time to determine growth rate and the like. In some embodiments, the service provider 10 can infer a health level of the livestock based on a correlation of the change in the weight. In some instances, weight can be determined in combination with other elements such as feeding or water frequency to make inferences regarding health. For example, if an animal is losing weight and not visiting a feed trough frequently, this can be a sign of illness.

In some embodiments, the scale assembly may include a scanner 22 which can include a camera or equivalent means to scan each animal for various visual indications of health or growth. These parameters include, but are not limited to, yearling height, scrotal circumference, mature height, claw set, foot angle, body condition score, and/or hair shed.

Pictures of the animal can be obtained from different angles (using a plurality of cameras) with each camera being stationary to be able to accurately measure the aforementioned data. Pictures of a certain animal, from many angles, would then be analyzed using a machine learning based or deep learning-based computer vision algorithms to derive accurate score.

Figure 2:
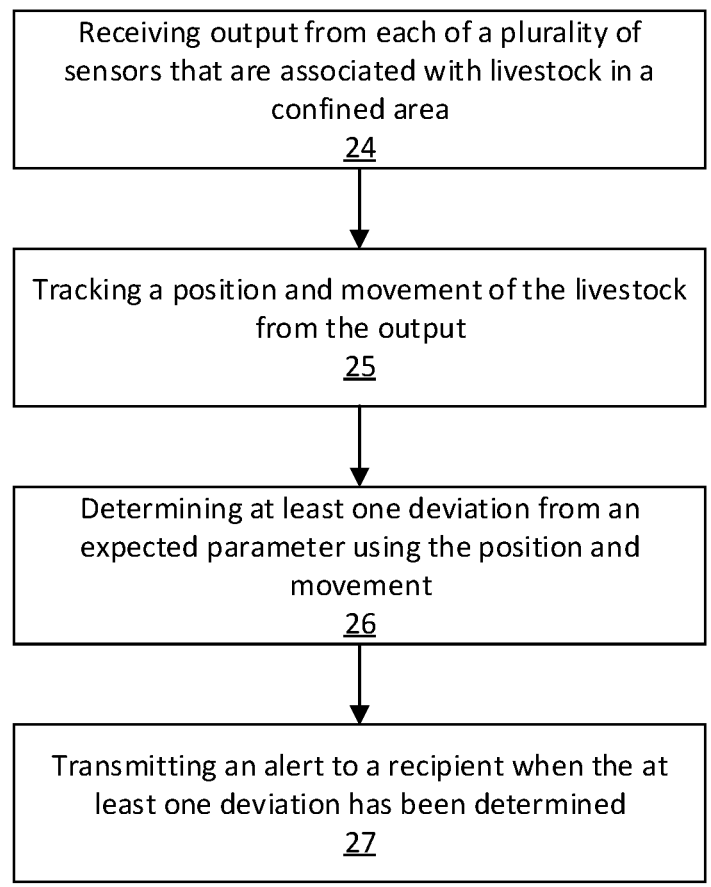
FIG. 2 is a flowchart of a method of the present disclosure related to monitoring the movement or location of livestock and transmitting an alert in response to the detection of a deviation.

FIG. 2 is a flowchart of an example embodiment of the present disclosure. The method includes a step 24 of receiving output from each of a plurality of sensors that are associated with livestock in a confined area. As noted above, these sensors could be passive or active sensors that can output one or more types of metrics and a unique identifier that can be used by a service provider to track one or more parameters that are indicative of the health of an animal. The sensor output can be evaluated, by a service provider, to determine if there are deviations or discrepancies that are indicative of sickness or well-being of an animal. Again, deviations can be calculated by comparing data over time or to certain thresholds or expected values.

In one embodiment, the method includes a step 25 of tracking a position and movement of the livestock from the output. That is, the sensor output is used to track position and movement using signals such as GPS or triangulation. These data can be used by the service provider to determine if an animal has movement patterns or behaviors that are indicative of livestock health status. For example, position and movement can be tracked to determine movement patterns or when the livestock are near water or feed. These data can be used in conjunction with other types of sensor output to determine more granular data about the livestock such as feeding or watering frequency.

In some embodiments, the method can include a step 26 of determining at least one deviation from an expected parameter using the position and movement. For example, if an animal's position is tracked and it indicates that the animal is moving less, the change in movement may indicate that the animal is hurt or ill. A deviation in this instance would include the parameter of distance traveled and this parameter is measured from beacon signals detected by multiple RTLS antenna's, GPS signals, or the like. The service provider maintains logic that can be used to evaluate the output of the sensors and determine when a deviation is present.

Next, the method can include a step 27 of transmitting an alert to a recipient when the at least one deviation has been determined. The alert could take many forms such as a text message or push notification that is transmitted to a mobile device by the service provider. Another example includes an email message. Yet another example includes triggering an alarm or generating a report that is stored in a database. The alert that is transmitted pertains to at least the one or more deviations in the parameter that was detected. As noted above, the sensor that outputs the motion and location signals (or another sensor also on the animal) also outputs a unique identifier so that motion and location signals are tracked per animal. Thus, the alert can be sent on a per-animal basis.

Figure 3:
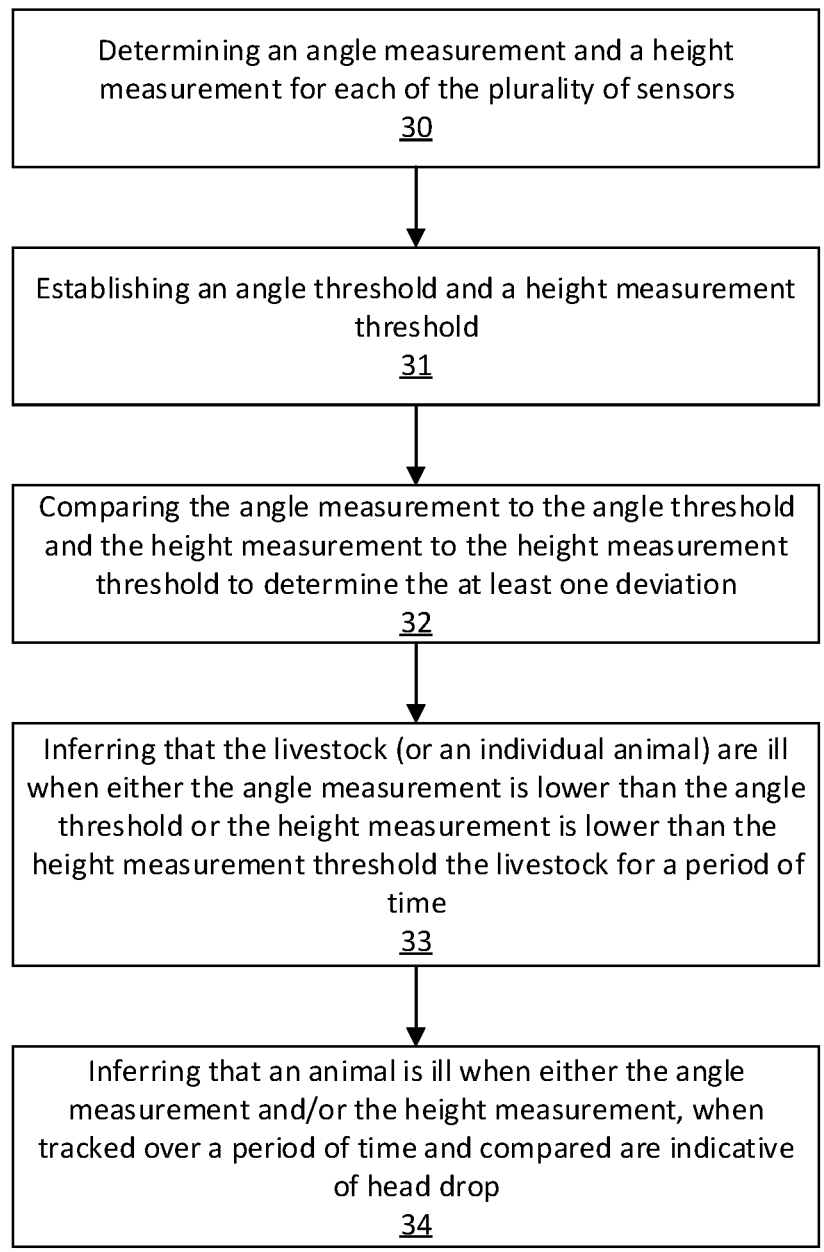
FIG. 3 is a flowchart of an example method of using sensor output to determine head hang or deviations in head angle measurement and/or height.

FIG. 3 is a flowchart of a related method that uses sensor output. It will be understood that in this example, the livestock are provided with a sensor or sensors that output signals that can be evaluated by the service provider to determine head height or head angle. The sensors may output signals that are indicative of head height or head angle and these data can be tracked over time. The service provider uses logic to determine when head height or head angle are deviant from expected values. As noted above, deviations can be determined by comparing changes in these values over time or by comparing these data to an expected value or threshold.

Thus, the method includes a step 30 of determining an angle measurement and a height measurement for each of the plurality of sensors. The method also includes a step 31 of establishing an angle threshold and a height measurement threshold, as well as a step 32 of comparing the angle measurement to the angle threshold and the height measurement to the height measurement threshold to determine the at least one deviation. The method may also include a step 33 of inferring that the livestock are ill when either the angle measurement is lower than the angle threshold or the height measurement is lower than the height measurement threshold of the livestock for a period of time. To be sure, this includes inferring the health of the livestock on an animal-by-animal basis. The method may alternatively include a step 34 of inferring that an animal is ill when either the angle measurement and/or the height measurement, when tracked over a period of time and compared are indicative of head drop. That is, an average of the angle measurement or the height measurement over time indicates head drop.

Figure 4:
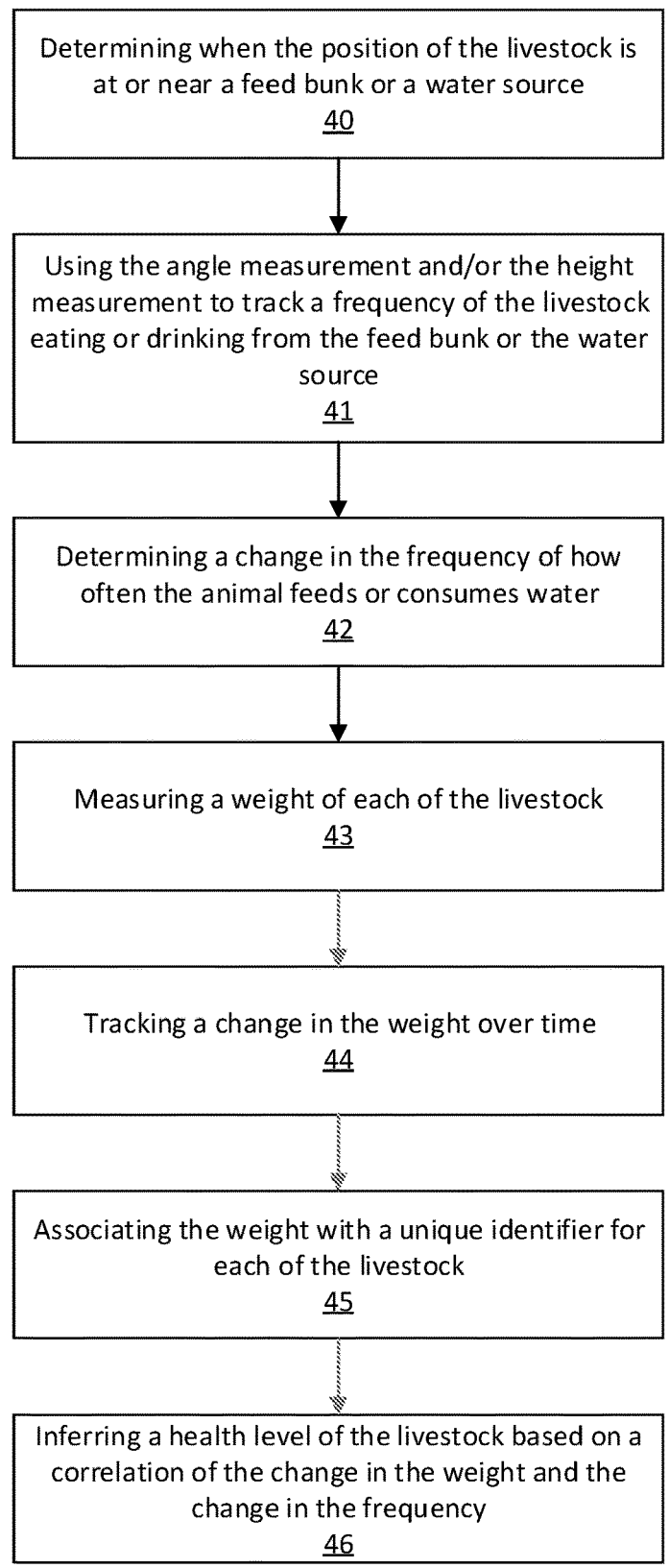
FIG. 4 is a flowchart of an example method of monitoring weight and/or how frequently an animal feeds or drinks water.

FIG. 4 is a flowchart of an example method of determining feeding or watering frequency. The method can include a step 40 of determining when the position of the livestock is at or near a feed trough or a water source. That is, the service provider can receive data from sensors associated with livestock, such as location signals. The service provider knows the location of various feed troughs or water sources and can determine when an animal is co-located with one of these locations.

In addition to location data, the sensors may also provide head height and angle signals. The method can include a step 41 of using the angle measurement and/or the height measurement to track a frequency of the livestock eating or drinking from the feed trough or the water source. For example, the service provider can determine when an animal is at a feed trough and then determine changes in head angle or head height which are indicative of the animal feeding. Accelerometer data is not required to make these inferences, but can be a source of secondary verification.

In some embodiments, these behaviors can be tracked over time in a step 42 of determining a change in the frequency of how often the animal feeds or consumes water. As noted above, when these changes in feeding or water consumption are detected, these changes are an example deviation of a parameter or multiple parameters.

The method can include a step 43 of measuring a weight of each of the livestock, as well a step 44 of tracking a change in the weight over time. In some embodiments, the method includes a step 45 of associating the weight with a unique identifier for each of the livestock. Again, the unique identifier is transmitted each time a sensor transmits data to the service provider so that the data can be associated with a unique animal.

Next, the method may include a step 46 of inferring a health level of the livestock based on a correlation between the change in the weight and the change in the frequency. For example, if an animals weight drops or feeding frequency decreases (sometimes these are correlated), this can trigger an alert. These sensor data can be used to estimate an average daily weight gain and a dry matter intake expected progeny differences.

Figure 5:
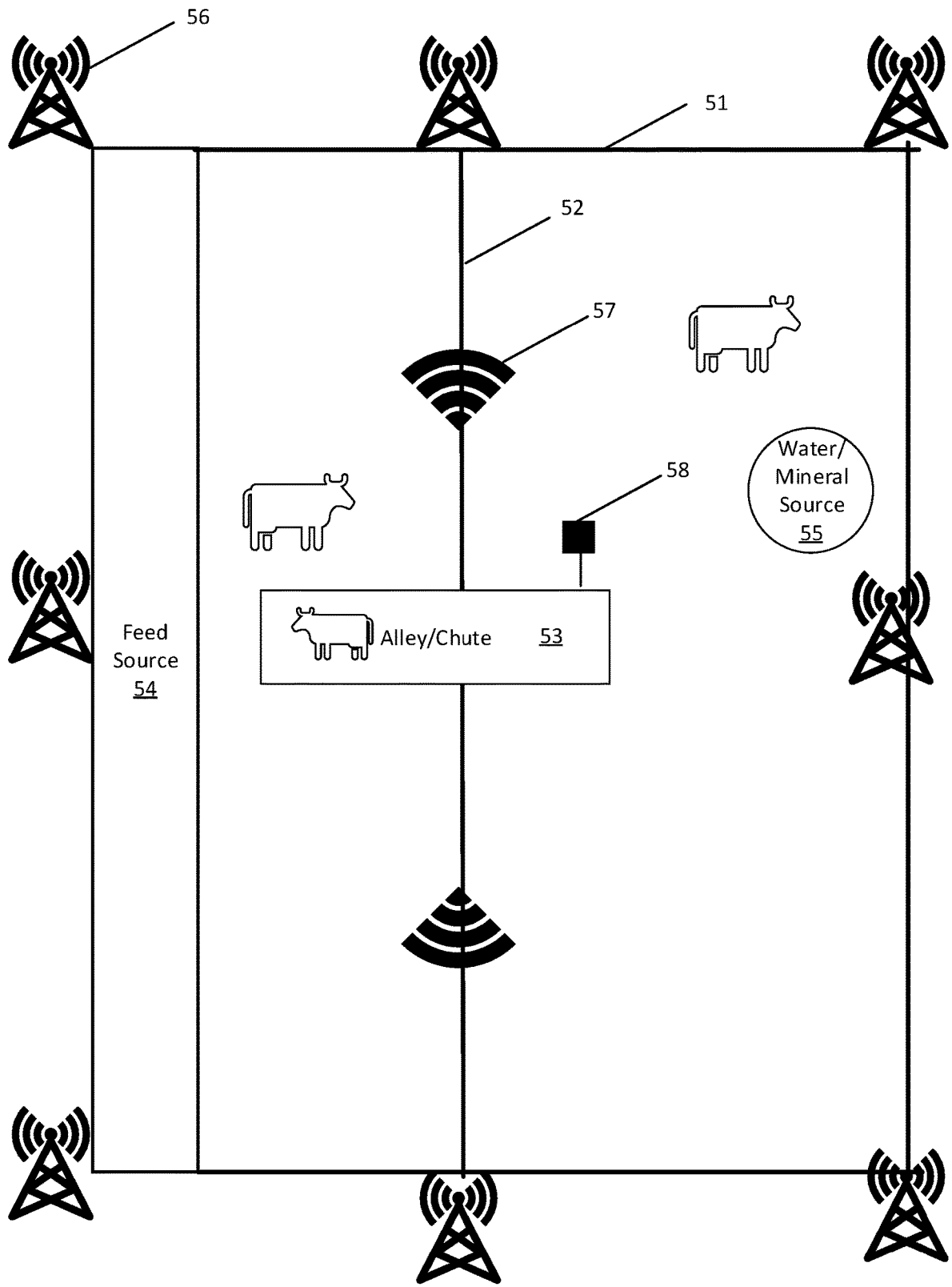
FIG. 5 is another example system of the present disclosure, which includes elements of a real-time location system.

FIG. 5 is a schematic view of another example system. This system uses a "known" physical layout of anchors, or antennas, to determine the location of sensors/tags that emit beacons signals via RF with the anchors range. An RTLS system includes the physical antenna anchors, and a positioning engine (in a service provider see FIG. 1) that uses the computed data from the RTLS anchors and that data can be transformed into position data.

The system can use an Angle of Arrival (AoA) Bluetooth protocol, which is a technology defined in version 5.1/5.2 of the Bluetooth Standard and involves mounting antenna arrays in designated spots around an enclosure. Each array can determine the direction that a beacon signal it receives was sent from. When two antenna arrays two directions off of known locations are determined, triangulation can be used to find the position of the sensor that sent out a beacon signal. Ultra-Wide Band (UWB) is a different technology that can be used and includes multiple antennas located in known positions. UWB also listens for beacon signals of the UWB kind and determines the position of the sensor that the beacon signal originated from by comparing how long it took for the beacon to get to each antenna mounted at a known location in the area. GPS is another example of a RTLS system, with GPS chips receiving signals "beacons" from GPS Satellites at known locations in the sky, which allows for the GPS chips themselves to determine their location.

In detail, the system 50 includes an enclosure 51 that could be any enclosed area of any size. The enclosure is defined by a fence or railing. The enclosure 51 can be divided into separate areas that are defined by a fence section 52. A chute or alley 53 can exist between these separated areas of the enclosure. This chute or alley 53 can accommodate any type of equipment such as a scale but in general the chute or alley 53 is sized to allow the presence of only one animal at a time. The animal can be enticed to traverse through the chute or alley 53 by the location of food in a food source 54. Conversely, the animal can also be enticed into the other area of the enclosure by the presence of a water or mineral source 55. A directional antenna, base station and visual scanner can be included in an infrastructure element 58. A camera can be placed at the four corners of the alley/chute in some embodiments. These cameras can be mounted at differing heights relative to one another. In some instances, multiple chutes or alleys may be located along the fence section.

To enable communication and data gathering, a plurality of real-time location antennas/anchors (RTLA), such as RTLA 56, may be positioned around the perimeter or the enclosure 51. Also included in the system 50 are RF monuments, such as RF monument 57 that can be mounted in a physical location. Additional or fewer monuments can be included. One purpose of the RF monument is to mark a location to the RTLS system by sending out beacons signals to all RTLS anchors in range. This can be used to mark points of interest, and to make set up of an RTLS system simpler as using an RF monument to mark the edges of things like fencing is usually easier than surveying every single point on every fence. Additionally, RF monuments tend to be more resistant to atmospheric changes when used to layout in bound and out of bound areas.

An RTLS system includes several RTLS antenna arrays located at fixed locations around an enclosure with animals that have sensors/tags attached and beaconing at regular intervals. When a beacon signal is detected by multiple RTLS antenna's then the RTLS can determine the position of the sensor attached to the animal that sent the detected beacon signal. From there, with an enclosure equipped with RTLS antenna array coverage the activity of a large group of animals with sensors beaconing at regular intervals could be tracked. This would allow for tracking changes in the behavior of individual animals over time, as the sensors are attached to known places on animals. Behaviors like an animal growing from a calf to a fully grown adult happen and the sensor/tag mounting point on the animal would tend to get higher, allow for behavioral changes to be detected like sharp increases or decreases in activity, and also allow for tracking herd information, such as how social an animal is with other animals. All of those are examples of behavior where a problem can indicate sickness, from not gaining weight, to odd movement patterns indicating hurt animals or animals that are very energetic. The RTLS system can then be combined with a number of other features in order to provide more information about livestock behavior to the end user. The RTLS setup can virtually track when an animal is next to food/water or another point of interest, but an additional embodiment would involve including elements like RF Monuments around points of interest or on fencing to physically mark out clear boundaries to the RTLS Anchor's in order to ease setup.

An RTLS anchor's fixed positions can drift overtime, typically due to atmospheric changes, to combat this RF monuments can be placed in known locations at a set distance between the RTLS anchors. So, when the RTLS anchors positions begin to drift the system will realize the RF monuments distance has changed and the RTLS anchors will self-adjust back to their correct position so that it can continue generating accurate data.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine and/or machine learning algorithm, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the present disclosure will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the embodiments in the present disclosure, suitable methods and materials are described above. Thus, the present disclosure is not intended to be limited to the embodiments shown, but is to be accorded the widest scope consistent with the principles and features disclosed herein.

What is claimed is:

1. A method, comprising:
receiving output from a plurality of sensors that are attached to a respective ear of a respective livestock in a confined area;
tracking a position and movement of the livestock from the output;
establishing an angle threshold and a height measurement threshold for the plurality of sensors relative to a position of a feed trough or a water source in the confined area;
determining that the position of the livestock is at or near a feed trough or a water source based on tracking the position of the livestock;
responsive to determining that the position of the livestock is at or near a feed trough or a water source, obtaining one or both of an angle measurement and a height measurement of the plurality of sensors relative to the position of the feed trough or the water source;
comparing one or both of: the angle measurement to the angle threshold and the height measurement to the height measurement threshold to determine the occurrence of one or both of a deviation of the angle measurement from the angle threshold and a deviation of the height measurement from the height measurement threshold;
determining a change in the frequency of the livestock eating or drinking based on one or both of the deviation of the angle measurement and the deviation of the height measurement; and
transmitting an alert to a recipient based on the change in frequency of the livestock eating or drinking.

2. The method according to claim 1, further comprising:
transmitting the output to a base station by the plurality of sensors; and
forwarding the output to a service provider by the base station.

3. The method according to claim 1, further comprising inferring that the livestock are ill when either the angle measurement is lower than the angle threshold or the height measurement is lower than the height measurement threshold of the livestock for a period of time.

4. The method according to claim 1, further comprising:
measuring a weight of each of the livestock; and
tracking a change in the weight over time.

5. The method according to claim 4, further comprising associating the weight with a unique identifier for each of the livestock.

6. The method according to claim 4, further comprising inferring a health level of the livestock based on a correlation of the change in the weight and the change in the frequency of the livestock eating or drinking.

7. The method according to claim 4, further comprising estimating an average daily weight gain and a dry matter intake expected progeny differences.

8. The method according to claim 1, further comprising using an optical scanner to determine any one or more of yearling height, scrotal circumference, mature height, claw set, foot angle, body condition score, marbling, ribeye area, fat thickness and/or hair shed.

9. A system, comprising:
a processor; and
a memory for storing instructions, the processor executing the instructions to:

receive output from a plurality of sensors that are attached to a respective ear of a respective livestock in a confined area;

track a position and movement of the livestock from the output;

establish an angle threshold and a height measurement threshold for the plurality of sensors relative to a position of a feed trough or a water source in the confined area;

determine that the position of the livestock is at or near the feed trough or the water source based on the tracked position of the livestock;

responsive to the determination that the position of the livestock is at or near the feed trough or the water source, obtain one or both of an angle measurement and a height measurement of the plurality of sensors relative to the position of the feed trough or the water source;

compare one or both of: the angle measurement to the angle threshold and the height measurement to the height measurement threshold to determine the occurrence of one or both of a deviation of the angle measurement from the angle threshold and a deviation of the height measurement from the height measurement threshold;

determine a change in the frequency of the livestock eating or drinking based on one or both of the deviation of the angle measurement and the deviation of the height measurement; and transmit an alert to a recipient based on the change in the frequency of the livestock eating or drinking.

10. The system according to claim 9, further comprising a base station that transmits the output from the plurality of sensors.

11. The system according to claim 9, wherein the processor is configured to:

infer that the livestock are ill when either the angle measurement is lower than the angle threshold or the height measurement is lower than the height measurement threshold of the livestock for a period of time.

12. The system according to claim 11, further comprising a scale, wherein the processor is configured to:

receive from the scale a weight of each of the livestock; and track a change in the weight over time.

13. The system according to claim 12, further comprising a water trough or livestock attractor on a side of the scale, the scale being placed in an area that permits single file movement of the livestock over the scale.

14. The system according to claim 13, wherein the processor is configured to:

associate the weight with a unique identifier for each of the livestock; and infer a health level of the livestock based on a correlation of the change in the weight and the change in the frequency.

15. The system according to claim 14, wherein the processor is configured to estimating an average daily weight gain and a dry matter intake expected progeny differences.

16. The system according to claim 9, further comprising an optical scanner that determines any one or more of yearling height, scrotal circumference, mature height, claw set, foot angle, body condition score, and/or hair shed.

* * * * *